United States Patent [19]

Kameyama et al.

[11] Patent Number: 5,246,723
[45] Date of Patent: Sep. 21, 1993

[54] MATERIAL FOR FOOD AND METHOD FOR PRODUCTION THEREOF

[75] Inventors: Toshiki Kameyama; Naoya Amemiya; Toshiyasu Kato; Makoto Suzuki; Makoto Watanabe; Michiyo Shibata, all of Nakakoma, Japan

[73] Assignee: Terumo Kabushiki Kaisha, Tokyo, Japan

[21] Appl. No.: 493,743

[22] Filed: Mar. 15, 1990

[30] Foreign Application Priority Data

Mar. 16, 1989 [JP] Japan .................................. 1-64650
Jan. 17, 1990 [JP] Japan .................................. 2-6317

[51] Int. Cl.$^5$ ........................ A21D 2/16; A23L 1/10
[52] U.S. Cl. .................................. 426/549; 426/653; 426/804; 514/866
[58] Field of Search ................ 426/549, 653, 804; 514/866

[56] References Cited

U.S. PATENT DOCUMENTS

| | | | |
|---|---|---|---|
| 3,743,512 | 7/1973 | Hansen | 426/653 |
| 4,137,336 | 1/1979 | Radlove | 426/653 |
| 4,315,041 | 2/1982 | Fukuda et al. | 426/653 |
| 4,363,826 | 12/1982 | Fukuda et al. | 426/653 |
| 4,477,479 | 10/1984 | Jervis | 426/653 |
| 4,483,880 | 11/1984 | Koizumi et al. | 426/653 |
| 4,609,560 | 9/1986 | Yuda et al. | 426/653 |
| 4,684,526 | 8/1987 | Knightly | 426/653 |
| 4,748,027 | 5/1988 | Schou et al. | 426/653 |

FOREIGN PATENT DOCUMENTS

| | | |
|---|---|---|
| 0153870 | 9/1985 | European Pat. Off. . |
| 0251925 | 1/1988 | European Pat. Off. . |
| 3133471 | 3/1983 | Fed. Rep. of Germany . |
| 59-63152 | 4/1984 | Japan . |
| 63-129956 | 6/1988 | Japan . |

OTHER PUBLICATIONS

Jenkins, D. J. A. et al., Am. J. Clin. Nutr., vol. 34, Mar. 1981, pp. 362-366, "Glycemic index of foods: a physiological basis for carbohydrate exchange".

Jenkins, D. J. A. et al., Diabetologia, vol. 23, 1992, pp. 477-484, "The Diabetic Diet, Dietary Carbohydrate and Differences in Digestibility".

Collier, G. et al., Diabetologia vol. 26, 1982, pp. 50-54, "Effect of co-ingestion of fat on the metabolic responses to slowly and rapidly absorbed carbohydrates".

Primary Examiner—Jeanette Hunter
Assistant Examiner—Mary S. Mims
Attorney, Agent, or Firm—Burns, Doane, Swecker & Mathis

[57] ABSTRACT

A material for food of slow digestive absorption, comprising a farinaceous substance and a fatty acid compound bonded to said farinaceous substance and having an occupation ratio to the amylose in the farinaceous substance by the fatty acid compound in the range of not less than 10%.

11 Claims, 13 Drawing Sheets

MATERIAL FOR FOOD AND METHOD FOR PRODUCTION THEREOF

BACKGROUND OF THE INVENTION

1. Field of the Invention

This invention relates to a material for food and a method for the production thereof. More particularly, the present invention relates to a material for food which is digestively absorbed at a retarded speed as compared with the conventional starch and a method for the production thereof.

In recent years, the patients of obesity due to enhancement of eating habits are sharply increasing in advanced societies. Persons of a high level of obesity are two to three times as susceptible of diabetes, atherosclerosis, cardiopathy, etc. Such diseases as gout, postoperative complications, cholelithiasis, lumgago, and hepatopathy which are associated with obesity are growing incessantly in prevalence. Thus, the obesity has come to pose itself a serious problem in social health.

2. Description of the Prior Art

The practice of decreasing the caloric intake has been heretofore regarded as a worthwhile measure to cure and prevent the obesity. Since this practice compels the patient to feel the sensation of hunger and even starvation and discourages him from continuing the painful chore, however, it is usually performed in conjunction with one of the following methods.

One of the methods consists in appreciably narrowing the inner volume of the patient's stomach by setting a balloon fast inside the stomach or filling up the greater part of the stomach so that a small food intake may impart the stimulus of mechanical expansion to the stomach. The method of this nature, however, is undesirable because it is a permanent measure necessitating a surgical operation and possibly entailing a secondary effect.

Another method consists in causing the patient to eat an extender such as dietary fibers and an adhesion enhancer optionally as mixed with other food. This method aims to lower the caloric value of food per unit weight by utilizing the nature that dietary fibers are non-digestive. Since the dietary fibers have unpleasant taste and palatability, they have the disadvantage that they cannot be easily ingested by themselves in a large amount and, even when used in conjunction with meal, they seriously impair the taste and palatability of the meal in most cases. Further, generous injection of dietary fibers is undesirable because it prevents the absorption of other beneficial nutrients and entails such secondary effects as diarrhea and constipation.

It has been recently demonstrated that carbohydrates which are digestively absorbed slowly are not closely associable with obesity as compared with carbohydrates which are digestively absorbed rapidly [Jenkins, D. J. A., et al., Am. J. Clin. Nutr. 34 1981, pp. 362–366]. It is, therefore, logically concluded that effective prevention and alleviation of obesity can be attained by using food containing carbohydrates of slow digestive absorption instead of resorting to the practice of observing a low caloric intake.

Further, the use of this food checks the otherwise possible sharp increase of the postprandial blood sugar content [Jenkins, D. J. A., et al.: The Diabetic Diet, Dietary Carbohydrate and Differences in Digestibility, Diabetologia, 23: 477–484 (1982): Collier, et al.: Effect of co-ingestion of fat on the metabolic responses to slowly and rapidly absorbed carbohydrates, Diabetologia, 25: 50–54 (1984)]. It is, therefore, inferred that the use of this food facilitates management of the morbidity and nutrition of a patient of diabetes.

As carbohydrates of slow digestive absorption, the so-called high-amylose corn starch prepared from amylomaze and various carbohydrates cooked in combination with a large volume of oil or fat have been known heretofore to the art. The former carbohydrate finds no appreciable utility because it is useful only in a limited range of applications and is deficient in taste and palatability. The latter carbohydrates are not effective in combating diabetes because they bring about an addition to the caloric intake.

None of the materials for food heretofore known to the art allows slow digestive absorption, produces taste and palatability equivalent to those of ordinary starch, and finds extensive utility.

SUMMARY OF THE INVENTION

This invention, therefore, is characterized by providing a novel material for food and a method for the production thereof. This aims to provide a material for food which allows slow digestive absorption, produces taste and palatability equivalent to those of ordinary starch, and finds extensive utility and a method for the production thereof.

The objects described above are accomplished by a material for food of slow digestive absorption, comprising a farinaceous substance and a fatty acid compound bound to the farinaceous substance and having a occupation ratio to the amylose in the farinaceous substance by the fatty acid compound in the range of not less than 10%.

This invention further discloses a material for food wherein the fatty acid compound is an amphipatic substance. This invention further discloses a material for food wherein the amphipatic substance is a free fatty acid or a salt or an ester thereof.

This invention further discloses a material for food wherein the farinaceous substance is a cereal powder or cereal grains. This invention further discloses a material for food wherein the amylose ratio to the amylose in the farinaceous substance by the fatty acid compound is in the range of not less than 40%.

The objects described above are further accomplished by a method for the production of a material for food of slow digestive absorption, which is characterized by adding to a farinaceous substance a fatty acid compound dissolved or dispersed advance in a solvent thereby causing the farinaceous substance and the fatty acid compound to contact each other.

The invention further discloses a method for the production of a material for food, wherein the gravimetric ratio of the farinaceous substance to the solvent is in the range of 100:10–10,000 and the gravimetric ratio of the farinaceous substance to the fatty acid compound is in the range of 100:2–50. This invention further discloses a method for the production of a material for food, wherein the gravimetric ratio of the solvent is one member or mixture of two or more members selected from the group consisting essentially of water, alcohol, glycerin, alkylene glycols, and acetone. This invention also discloses a method for the production of bread or cake of slow digestive absorption, which is characterized by drying and pulverizing the material for food obtained by the method described above and baking the pulverized material in a prescribed shape. This invention further discloses a method for the production of noodle of slow digestive absorption, which is characterized by drying and pulverizing the material for food obtained by the method of production described above and kneading the pulverized material with added water.

The objects described above are further accomplished by food which is characterized by containing a material for food either composed of a farinaceous substance and a fatty acid compound bonded to the farinaceous substance, with a occupation ratio to the amylose in the farinaceous substance by the fatty acid compound in the range of not less than 10%, or obtained by the method for the production of a material for food of slow digestive absorption comprising the steps of adding to a farinaceous substance a fatty acid compound dissolved or dispersed in advance in a solvent thereby causing the farinaceous substance and the fatty acid compound to contact each other. This invention also discloses food for combating obesity. This invention also discloses food for use by patients of diabetes.

DETAILED DESCRIPTION OF THE PREFERRED EMBODIMENTS

Figure 1:
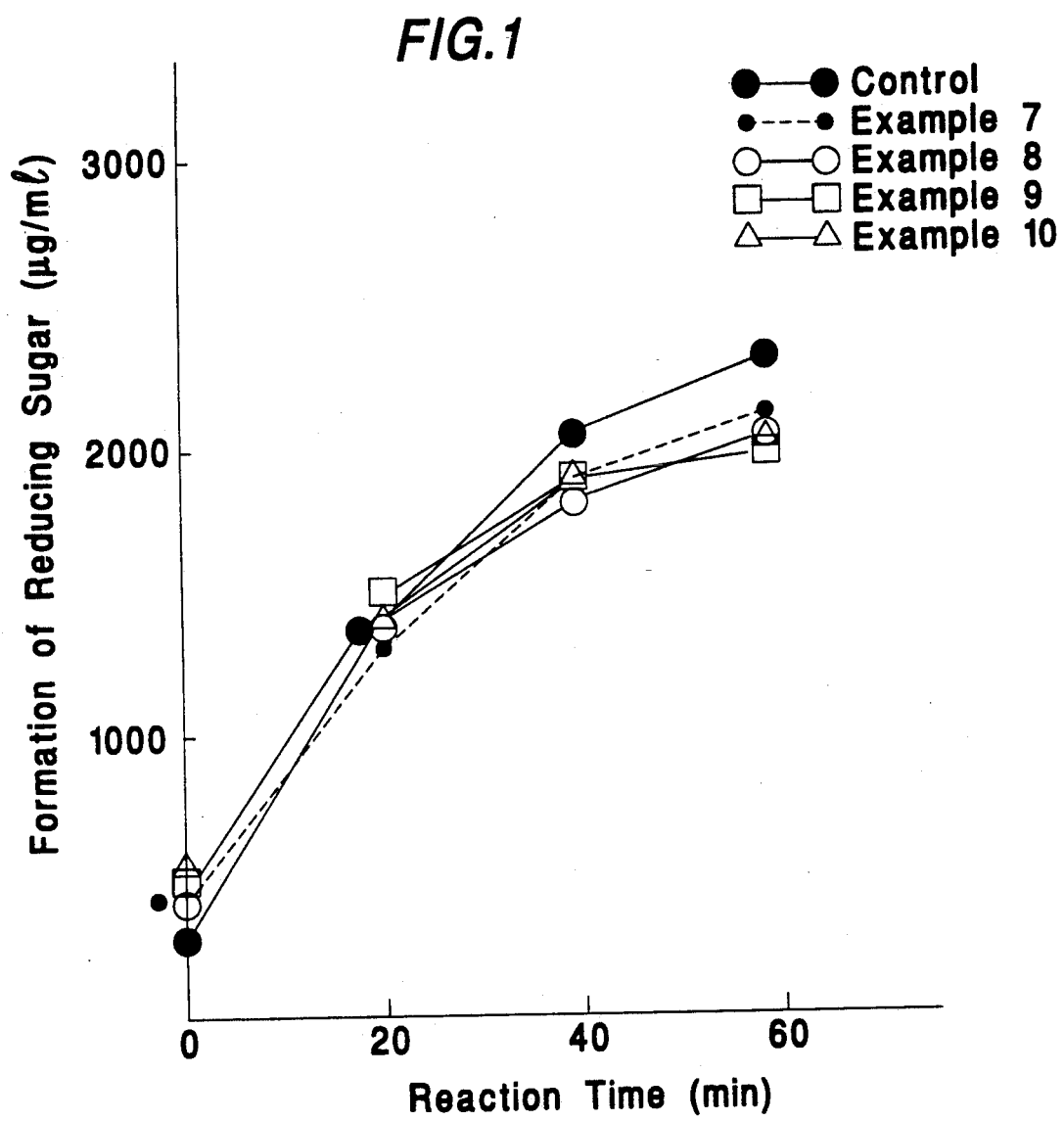
FIGS. 1 to 7 are graphs showing the amounts of reducing sugar produced in the PPA (porcine pancreatic α-amilase) treatment performed in working examples and controls on materials for food according with the present invention.

The material for food according with the present invention is characterized by comprising a farinaceous substance and a fatty acid compound bound to the farinaceous substance and having a occupation ratio to the amylose in the farinaceous substance by the fatty acid compound in the range of not less than 10%.

In the material for food of this invention, since amylose in the farinaceous substance is bonded with the fatty acid compound in such a structure as to render formation of a complex with an enzyme difficult to proceed, the farinaceous substance is not susceptible of the action of such a digestive enzyme as amylase. This is why the farinaceous substance in the material of this invention is digestively absorbed at a slow speed as compared with the ordinary farinaceous. The fact that the bonding of the farinaceous substance with the fatty acid compound effected as described above enables the produced food to be digestively absorbed at a slow speed has been found for the first time by the present inventors. This knowledge constitutes itself the backbone of the present invention. It has been further found by the present inventors that the farinaceous substance which has undergone this treatment possesses taste and palatability equivalent to those of the farinaceous substance in the untreated state. The present invention has been perfected as the result.

Incidentally, the techniques for modifying wheat flour or rice flour by the action of an emulsifier are described in various directions on handling of emulsifiers and disclosed as in Japanese Patent Publication SHO 59(1984)-13,177, Japanese Patent Publication SHO 59(1984)-30,055, Japanese Patent Laid-Open 60(1985)-30,633, Japanese Patent Laid-Open SHO 62(1987)-55,048, Japanese Patent Laid-Open SHO 62(1987)-83,857, Japanese Patent Laid-Open SHO 62(1987)-143,659, Japanese Patent Laid-Open SHO 62(1987)-122,549, Japanese Patent Laid-Open SHO 62(1987)-158,446, and Japanese Patent Laid-Open SHO 63(1988)-14,650, Japanese Patent Laid-Open SHO 63(1988)-71,134, Japanese Patent Laid-Open SHO 63(1988)-152,935, Japanese Patent Laid-Open SHO 63(1988)-192,354, Japanese Patent Laid-Open SHO 64(1989)-63,332, and Japanese Patent Laid-Open HEI 1(1989)-225,438, for example. These techniques use a basic procedure which comprises merely mixing wheat flour or rice flour with a small amount of emulsifier and optionally subjecting the resultant mixture to application of pressure and heat for the purpose of enhancing expansibility of texture, improving the palatability of produced food, and preventing the produced food from aging by oxidation, for example. The materials for food which are produced by these techniques are not capable of significantly retarding the digestive absorption because the amylose in the farinaceous substance is not throughly occupied by the fatty acid compound. The truth of this statement is demonstrated in Controls 1 to 3 to be cited herein below.

Products of bonding between farinaceous substances and fatty acid esters have been published in various pieces of literature such as, for example, Starch Science Handbook (compiled under supervision of Jiro Nikuni, 1977). All these reports suggest thermally reversible bind between thermally gelatinized amylose and a fatty acid ester. These products of bonding, therefore, are considered to possess a structure different from the structure of the product of bonding brought about by the present invention in a state not resulting from thermal gelatinization, not allowing formation of a complex with a digestive enzyme, and permitting no reversion of the effect of union on exposure to heat.

The product of bonding obtained by protracted heating of pure amylose and a fatty acid ester as reportedly observed in Schoch's experiment [T. J. Schoch, Bakers Digest, 39, 48 (1965)] is far remote from the material for food of the present invention in terms of essential quality and process of manufacture and does not suggest the present invention in any respect.

The expression "digestive absorption at a slow speed" as used in the present specification refers to the rate of the decomposition with α-amylase which is not more than 95%, preferably not more than 85%, of the rate normal for the ordinary starch or, more specifically, untreated starch.

Now, the present invention will be described more specifically with reference to working examples.

The farinaceous substances which are usable as a raw material in the present invention include various types of starch originating in cereals and routinely served in meals, physicochemically or biologically synthesized species of starch, crude materials of such starch and processed materials of such starch, and mixtures of two or more such species of starch. These farinaceous substances can be used advantageously so long as they have sufficiently high starch contents. As concrete examples, the materials prepared as described above from rice, wheat, barley, rye, oat, maize, potato, sweet potato, and tapioka may be cited. It is particularly desirable in terms of nutrition and economy to use these cereals in the powdered or granulated form. It should be noted, however, that pure amylose (amylose content 100%) is undesirable because the amylose, on being bonded with a fatty acid compound as described specifically herein below, inhibits digestive absorption to an excessive extent possibly to induce poor digestion and seriously impairs taste and palatability.

The fatty acid compounds which are usable herein for the bonding with the farinaceous substance as described above include free fatty acids, fatty acid salts, and fatty acid esters. These fatty acid compounds can be used more desirably when they possess a hydrophobic alkyl (fatty acid) moiety available for the formation of a complex with the starch mentioned above and a hydrophilic hydroxyl group donor available for efficient contact with the starch. In this respect, the fatty acid esters are preferred over the other fatty acid compounds mentioned above. For the reason given above, those fatty acid compounds which are destitute of such hydroxyl group donor as triglyceride cannot be used in this invention. The term "fatty acid ester" as used herein means a substance formed by the bind between a saturated or unsaturated alkyl compound possessing a carboxyl group and a compound possessing an alkolic hydroxyl group (alcohol donor) through the medium of an ester bond. The fatty acid as a component of the fatty acid compound is desired to have 8 to 22 carbon atoms. The fatty acids which answer this description include caprylic acid, peralgonic acid, capric acid, undecylic acid, lauric acid, tridecylic acid, myristic acid, pentadecylic acid, palmitic acid, heptadecylic acid, stearic acid, nonadecanoic acid, arachic acid, behenic acid, undecylenic acid, oleic acid, elaidic acid, cetoleic acid, erucic acid, brassidic acid, linolic acid, linoleic acid, and arachidonic acid, for example.

The fatty acid salts which are usable herein include sodium salts, potassium salts, magnesium salts, etc. of the fatty acids enumerated above.

The alcohol donors owned by the fatty acid esters include glycerins, propylene glycols or polypropylene glycols, saccharides such as sucrose and maltose, sugar alcohols such as sorbitol, mannitol, erythritol, and arabitol, and glycerophosphoric acid, for example. As concrete examples of the fatty acid esters, there may be cited glycerin fatty acid esters such as decaglycerol monolaurate, decaglycerol monomyristate, hexaglycerol monostearate, decaglycerol monostearate, monoglycerol monostearate, decaglycerol distearate, decaglycerol tristearate, decaglycerol monooleate, decaglycerol trioleate, hexaglycerol monooleate, and decaglycerol pentaoleate, sucrose fatty acid esters such as sucrose stearate, sucrose palmitate, sucrose oleate, sucrose laurate, and sucrose behanate, sorbitan fatty acid esters such as sorbitan monolaurate, sorbitan monostearate, and sorbitan monooleate, and lecithin, and lysolecithine. The HLB (hydrophilic lipophilic balance) of such a fatty acid ester to be used in this invention may fall in any range.

In the material for food of the present invention, though the ratio of the farinaceous substance and the fatty acid compound is variable with the kind of starch, the kind of the fatty acid compound, and the conditions of the production of the material, it is desired to be such that the occupation ratio to the amylose in the farinaceous substance by the fatty acid compound is in the range of not less than 10%, preferably not less than 40%. If the occupation ratio to the amylose in the farinaceous substance by the fatty acid compound is less than 10%, no sufficient retardation is attained in the speed of digestive absorption.

The expression "occupation ratio to the amylose in the farinaceous substance by the fatty acid compound" as used in the present specification refers to the value to be calculated from the magnitude of iodine affinity (amount of iodine bonded to amylose) determined by the method of amperometric titration. The iodine affinity serves as a criterion for the estimation of the amylose content in a given sample by utilizing the fact that iodine binds itself mainly with amylose in starch and forms a complex. In the case of the material for food of the present invention in which a fatty acid compound is bonded to a farinaceous substance, the iodine affinity of the farinaceous substance is decreased from the untreated farinaceous substance proportionately to the amount of amylose bonded to the fatty acid compound (not to the iodine). The occupation ratio (%) to the amylose in the farinaceous substance by the fatty acid compound, therefore, is obtained by subtracting the iodine affinity of the treated farinaceous substance from the iodine affinity of the untreated farinaceous substance, dividing the difference by the iodine affinity of the untreated farinaceous substance, and multiplying the quotient by 100, as indicated by the following formula:

$$\text{(Occupation ratio to the amylose in farinaceous substance by fatty acid compound)} = [\{(\text{Iodine affinity of untreated farinaceous substance}) - (\text{iodine affinity of treated farinaceous substance})\} / (\text{Iodine affinity of untreated farinaceous substance})] \times 100 \, (\%)$$

The material for food of this invention described above can be produced, for example, by adding to a farinaceous substance as a raw material a fatty acid compound dissolved or dispersed in advance in a solvent thereby allowing the farinaceous substance and the fatty acid compound to contact each other.

Though the addition of the fatty acid compound dissolved or dispersed in advance in the solvent to the farinaceous substance as the raw material may be effected by exposing the farinaceous substance to the current of the solvent having the fatty acid compound dissolved or dispersed in advance therein, it is generally attained by adding the farinaceous substance to a suitable amount of so the solvent having the fatty acid compound dissolved or dispersed therein in advance and mixing them. By effecting the addition in this manner, the contact of the fatty acid compound with the farinaceous substance as the raw material is attained with improved efficiency and the bonding aimed at is accomplished successfully.

The solvent used for this addition is intended for ensuring uniform and efficient contact between the starch and the fatty acid compound. It is, therefore, desired to be a hydrophilic solvent enjoying high affinity for starch and ensuring uniform dispersion of the fatty acid compound. Specifically, one member or a mixture of two or more members is selected from among water, alcohol, glycerin, alkylene glycols, and acetone to suit the behavior of the fatty acid compound to be actually used in the material for food of the present invention. The amount of the solvent is desired to be in the range of 10 to 10,000 parts by weight, based on 100 parts by weight of the farinaceous substance, though it is variable with the kinds of farinaceous substance, fatty acid compound, and solvent to be actually used in the production of the material for food. The amount of the fatty acid compound to be dissolved or dispersed in advance in the solvent is desired to be in the range of 2 to 50 parts by weight, based on 100 parts by weight of the farinaceous substance.

The temperature of the reaction system during the contact of the farinaceous substance as the raw material with the fatty acid compound has no particular restriction except for the sole requirement that the solvent should be incapable of being solidified at the temperature. When the material for food is required to be obtained in a thermally cooked state, however, the contact mentioned above must be performed at a temperature at which the farinaceous substance as the raw material avoids undergoing thorough gelatinization. This temperature is desired to be not lower than 0° C. from the standpoint of economy, for example. It is desired to be not lower than the temperature at which gelatinization starts (generally in the range of 60° to 70° C., though variable with the kind of the farinaceous substance to be used) from the standpoint of avoiding gelatinization. Even at a temperature below the temperature at which the gelatinization starts, the binding of the farinaceous substance with the fatty acid compound can be attained in the solvent to the farinaceous substance thereby effecting the contact between the farinaceous substance and the fatty acid compound. Moreover, the farinaceous substance which has been bonded to the fatty acid at any temperature in the range specified above avoids readily undergoing gelatinization and allows ready retardation of digestive absorption. When the material for food is desired to be obtained in a state necessitating cooking by heating, the contact can be naturally carried out at a temperature exceeding the temperature at which gelatinization starts.

The material for food of the present invention is obtained by causing the farinaceous substance to contact substance the fatty acid compound in the presence of a suitable solvent thereby effecting the bonding of the fatty acid compound with the farinaceous substance as described above. The solvent which remains in the farinaceous substance after completion of the procedure described above may be removed, when necessary, by any of various methods of drying such as, for example, freeze drying, vacuum drying, and drying in draft.

The material for food of the present invention retains intact the taste and palatability of the farinaceous substance used as the raw material and, therefore, can be used in the same manner as the ordinary starch. It can be ingested in its unmodified form as food and can be applied to any of the items of food which are produced with ordinary starch. When the material is processed as described above for conversion into food, it may be given such treatments as washing, grinding, and heating, for example.

A noodle of slow digestive absorption can be produced by drying and pulverizing the material for food of this invention, adding a carbohydrate such as dextrin, common salt, sweet water, pigment, protein, and various minerals and vitamins, as required, to the resultant pulverized material, and kneading the resultant mixture in the presence of added water.

Bread or a cake can be produced by drying and pulverizing the material for food of the present invention, adding oil and fat, sugar, powdered milk, egg, baking powder or other suitable inflating agent, common salt, yeast, yeast foodstuff, and such oxidation-reduction agents as L-ascorbic acid, as required, to the resultant pulverized material, kneading the resultant mixture, and baking it.

The food of this invention obtained as described above is fully comparable in taste and palatability with the food containing ordinary starch and is digestively absorbed at a significantly retarded speed and, therefore, is used advantageously as food for combating obesity or as food for patients of diabetes. Further, the food of this invention can be used not only by human beings but also by animals other than human beings.

Now, the present invention will be described more specifically below with reference to working examples.

EXAMPLE 1

A mixture of 50 g of commercially available wheat flour with 5 liters of water having 5 g of sucrose stearic acid ester (produced by Mitsubishi Kasei Kogyo K.K. and marketed under product code of "S-1570") dispersed in advance therein was kept stirred at 65° C. for 60 minutes and then centrifuged at 3,000 rpm for 3 minutes to remove the supernatant and obtain a sample material for food. The sample was treated by the method indicated herein below to determine the occupation ratio to the amylose in the farinaceous substance by the fatty acid compound and the digestibility (after preparatory gelatinization) with the porcine pancreatic α-amylase (PPA). As the result, the occupation ratio to the amylose in the farinaceous substance by the fatty acid compound was found to be 95% and the digestibility with the PPA to be 74% of the untreated farinaceous substance.

EXAMPLE 2

A sample material for food was obtained by following the procedure of Example 1, excepting glycerol monostearic acid ester (produced by Riken Vitamin Co., Ltd. and marketed under trademark designation of "Emersy-MS") was used in the place of the sucrose stearic acid ester.

The sample was treated in the same manner as in Example 1 to determine the occupation ratio to the amylose in the farinaceous substance by the fatty acid compound and the digestibility (after preparatory gelatinization) with the PPA. As the result, the occupation ratio to the amylose in the farinaceous substance by the fatty acid compound was found to be approximately 100% and the digestibility with the PPA to be 64% of the untreated farinaceous substance.

EXAMPLE 3

A mixture of 50 g of commercially available rice powder with 5 liters of water having 5 g of sucrose stearic acid ester (produced by Mitsubishi Kasei Kogyo K.K. and marketed under product code of "S-1570") dispersed in advance therein was stirred at 65° C. for 120 minutes and then centrifuged at 3,000 rpm for 3 minutes to remove the supernatant and obtain a sample material for food.

The sample was treated in the same manner as in Example 1 to determine the occupation ratio to the amylose in the farinaceous substance by the fatty acid compound and the digestibility (after preparatory gelatinization) with the PPA. As the result, the occupation ratio to the amylose in the farinaceous substance by the fatty acid compound was found to be 78% and the digestibility with the PPA to be 87% of the untreated farinaceous substance.

EXAMPLE 4

A sample material for food was obtained by following the procedure of Example 3, excepting glycerol monostearate (produced by Reken Vitamin Co., Ltd. and marketed under trademark designation of "Emulsy-MS") was used in the place of the sucrose stearic acid ester.

The sample was treated in the same manner as in Example 1 to determine the occupation ratio to the amylose in the farinaceous substance by the fatty acid compound and the digestibility (after preparatory gelatinization) with the PPA. As the result, the occupation ratio to the amylose in the farinaceous substance by the fatty acid compound was found to be 34% and the digestibility with the PPA to be 905 of the untreated farinaceous substance.

EXAMPLE 5

One (1) kg of commercially available wheat flour and 3 liters of water having 50 g of glycerol monostearate (produced by Riken Vitamin Co., Ltd. and marketed under trademark designation of "Emulsy-MS") dispersed in advance therein were gently stirred at 30° C. for 60 minutes. The resultant mixture was freeze dried to obtain a sample material for food. When this sample was tested in the same manner as in Example 1 for the occupation ratio to the amylose in the farinaceous substance by the fatty acid compound, the occupation ratio to the amylose in the farinaceous substance by the fatty acid compound was found to be 43%.

EXAMPLE 6

A sample material for food was obtained by mixing one (1) kg of commercially available wheat flour with 3 liters of water having 50 g of lecithine (produced by Honen Seiyu K.K. and marketed under product code of "AY-A") dispersed therein in advance, gently stirring the resultant mixture at 30° C. for 60 minutes, and then freeze drying the stirred mixture. When this sample was treated in the same manner as in Example 1, the occupation ratio to the amylose in the farinaceous substance by the fatty acid compound was found to be 15% and the digestibility (after preparatory gelatinization) with the PPA to be 93% of the untreated farinaceous substance.

Control 1

When a mixture of 1 kg of commercially available wheat flour with 50 g of glycerol monostearate (produced by Riken Vitamin Co., Ltd. and marketed under trademark designation of "Emulsy-MS") was treated in the same manner as in Example 1, the occupation ratio to the amylose in the farinaceous substance by the fatty acid compound was found to be 0% (the iodine bonding capacity accounting for 107% of the untreated farinaceous substance). This fact indicates that no binding of the fatty acid compound with the farinaceous sbustance was attained by merely mixing the farinaceous substance with the fatty acid compound.

Control 2

A sample material for food was obtained by placing 400 g of weak wheat flour simultaneously with 8 g of sucrose stearic acid ester (produced by Mitsubishi Kasei Kogyo K.K. and marketed under product code of "S-770") and 80 ml of water in a mixer having an inner volume of 5 liters, stirring them at a rotational speed of 60 rpm for 5 minutes for homogenization, and then freeze drying the resultant homogeneous mixture. When this sample was treated in the same manner as in Example 1, the occupation ratio to the amylose in the farinaceous substance by the fatty acid compound was found to be 5% and the digestibility with the PPA to be 98% of the untreated wheat flour. This fact indicates that no binding of the fatty acid compound with the farinaceous sbustance could be obtained by the contact with a small amount of the fatty acid compound.

Control 3

A sample material for food was obtained by placing 400 g of weak wheat flour simultaneously with 50 g of glycerol monostearate (produced by Riken Vitamin K.K. and marketed under trademark designation of "Emulsy-MS") and 1 liter of water in a mixer having an inner volume of 5 liters, mixing them at a rotational rate of 60 rpm for 5 minutes for homogenization, and further freeze drying the resultant mixture. When the sample was treated in the same manner as in Example 1, the occupation ratio to the amylose in the farinaceous substance by the fatty acid compound was found to be 8% and the digestibility with the PPA to be 97% of the untreated wheat flour. This fact indicates that no bonding of the fatty acid compound with the farinaceous substance could be obtained by the contact with a small amount of the fatty acid compound when a large amount of solvent is supplied.

EXAMPLES 7 TO 10

Sample materials for food were obtained by mixing 50 g of commercially available wheat flour with 5 liters of water having 5 g of a varying fatty acid ester dispersed in advance therein and stirring the resultant mixture at 95° C. for 30 minutes.

The samples were dried in draft at 80° C. and then tested for digestibility with the PPA. As a control, a sample material for food was obtained by repeating the procedure described above, excepting water containing no fatty acid ester was used instead. The results are shown in Table 1 and FIG. 1.

TABLE 1

| | Fatty acid ester | Digestibility with PPA (based on control) |
|---|---|---|
| Example 7 | Sucrose stearic acid ester (produced by Mitsubishi Kasei Kogyo K.K. and marketed under product code of "S-1570) | 84% |
| Example 8 | Glycerol monostearate (produced by Riken Vitamin Co., Ltd. and marketed under trademark designation of "Emulsy-MS") | 80% |
| Example 9 | Glycerol monostearate (containing disperssant) (produced by Riken Vitamin Co., Ltd. and marketed under product code of "MM- | 73% |

TABLE 1-continued

| | Fatty acid ester | Digestibility with PPA (based on control) |
|---|---|---|
| | 100") | |
| Example 10 | Monoglycerol succinic acid monostearate (produced by Kao Soap Co., Ltd. and marketed under product code of "Step SS") | 75% |

EXAMPLES 11 TO 21

Sample materials for food were obtained by mixing 1 kg of commercially available potato starch with 500 g of water having dispersed in advance therein 50 g of a varying fatty acid compound indicated in Table 2 and stirring the resultant mixture at 25° C. for 20 minutes.

The samples were dried in draft at 50° C. and tested for digestibility (after preparatory gelatinization) with PPA. As a control, a sample material was obtained by following the procedure described above, excepting water containing no fatty acid compound was used instead. The results are shown in Table 2.

TABLE 2

| | Fatty acid compound | Carbon number of fatty acid portion | Double bond number in compound | Digestibility with PPA (based on control) |
|---|---|---|---|---|
| Example 11 | Decaglycerol caprylate (SY Glystar MCA 750, Sakamoto Phar. Ind. Corp.) | 8 | 0 | 89.9% |
| Example 12 | Decaglycerol laurate (SY Glystar ML 750, Sakamoto Phar. Ind. Corp.) | 12 | 0 | 81.3% |
| Example 13 | Decaglycerol monomyristate (Decaglyn 1-M, Nikko Chemicals Corp.) | 14 | 0 | 86.7% |
| Example 14 | Sucrose laurate (L-595, Mitsubishi Kasei Kogyo KK.) | 12 | 0 | 79.8% |
| Example 15 | Sucrose palmitate (P-1570, Mitsubishi Kasei Kogyo KK.) | 16 | 0 | 83.5% |
| Example 16 | Sucrose oleate (O-1570, Mitsubishi Kasei Kogyo KK.) | 18 | 1 | 84.7% |
| Example 17 | Sucrose behenate (B-370, Mitsubishi Kasei Kogyo KK.) | 22 | 0 | 93.0% |
| Example 18 | Glycerol oleate (Emulgy OL, Riken Vitamin Co., Ltd.) | 18 | 1 | 82.0% |
| Example 19 | Glycerol linolate (Emulgy MV, Riken Vitamin Co., Ltd.) | 18 | 2 | 83.8% |
| Example 20 | Lecithin hydrolyzate (Emulgy EL, Riken Vitamin Co., Ltd.) | — | — | 83.5% |
| Example 21 | Linoleic acid | 18 | 2 | 90.2% |

EXAMPLES 22 AND 23

Sample materials for food were obtained by adding 500 g of commercially available wheat four to 1.5 liters of water having dispersed in advance therein 50 g (Example 22) or 25 g (Example 23) of sorbitan lauric acid ester (produced by Kao Soap Co., Ltd. and marketed under trademark designation of "Emasol L-10"), allowing the resultant mixture to stand in an autoclave at 121° C. for 20 minutes, and thereafter freeze drying the cooked mixture.

Figure 2:
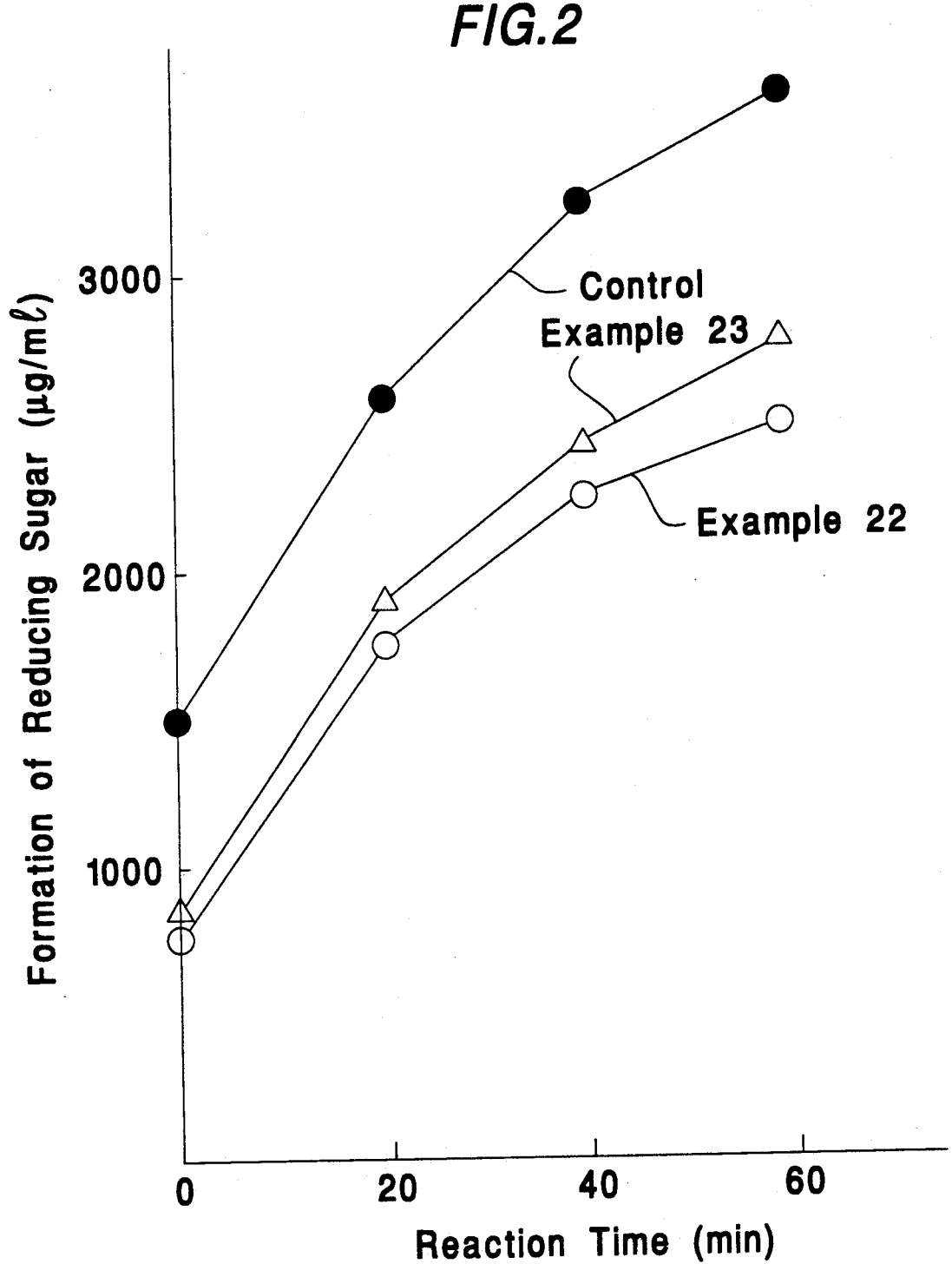

The samples were tested for digestibility with PPA. The results were, as shown in FIG. 2, 82% (Example 23) based on the farinaceous substance of a sample material for food prepared as a control by repeating the procedure described above, excepting the addition of sorbitan lauric acid ester to the water was omitted.

EXAMPLES 24 TO 26

Sample materials for food were obtained by adding to 50 g of a varying kind of wheat flour shown in Table 2, 5 liters of water containing 5 g of glycerol monostearate (produced by Riken Vitamin Co., Ltd. and marketed under trademark designation of "Emulsy-MS") having a small amount of propylene glycol (final concentration of 8 w/v %) dispersed in advanve therein and allowing the resultant mixture to stand at 95° C. for 30 minutes.

Figure 3:
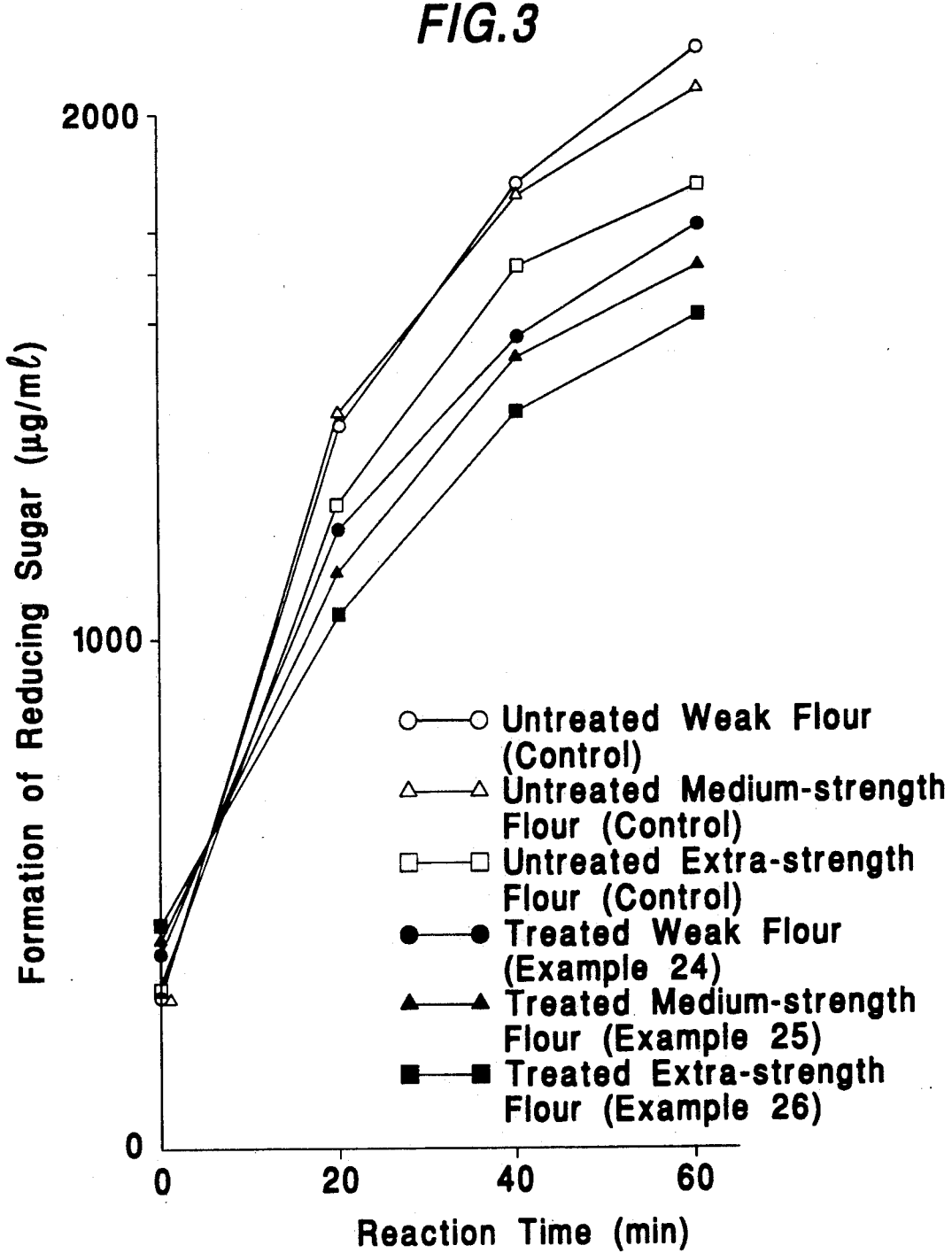

The samples were dried under a reduced vacuum at 60° C. and then tested for digestibility with PPA. The results are shown in Table 3 and FIG. 3.

TABLE 3

| Flour | Digestibility with PPA (based on untreated sample) |
|---|---|
| Example 24 Weak flour | 77% |
| Example 25 Medium-strength flour | 75% |
| Example 26 Extra-strength flour | 76% |

EXAMPLE 27

A sample material for food was obtained by adding to 50 g of cornstarch 5 liters of water having 5 g of sucrose stearic acid ester (produced by Mitsubishi Kasei Kogyo K.K. and marketed under product code of "S-1570") dispersed in advance therein and stirring the resultant mixture at 95° C. for 30 minutes.

Figure 4:
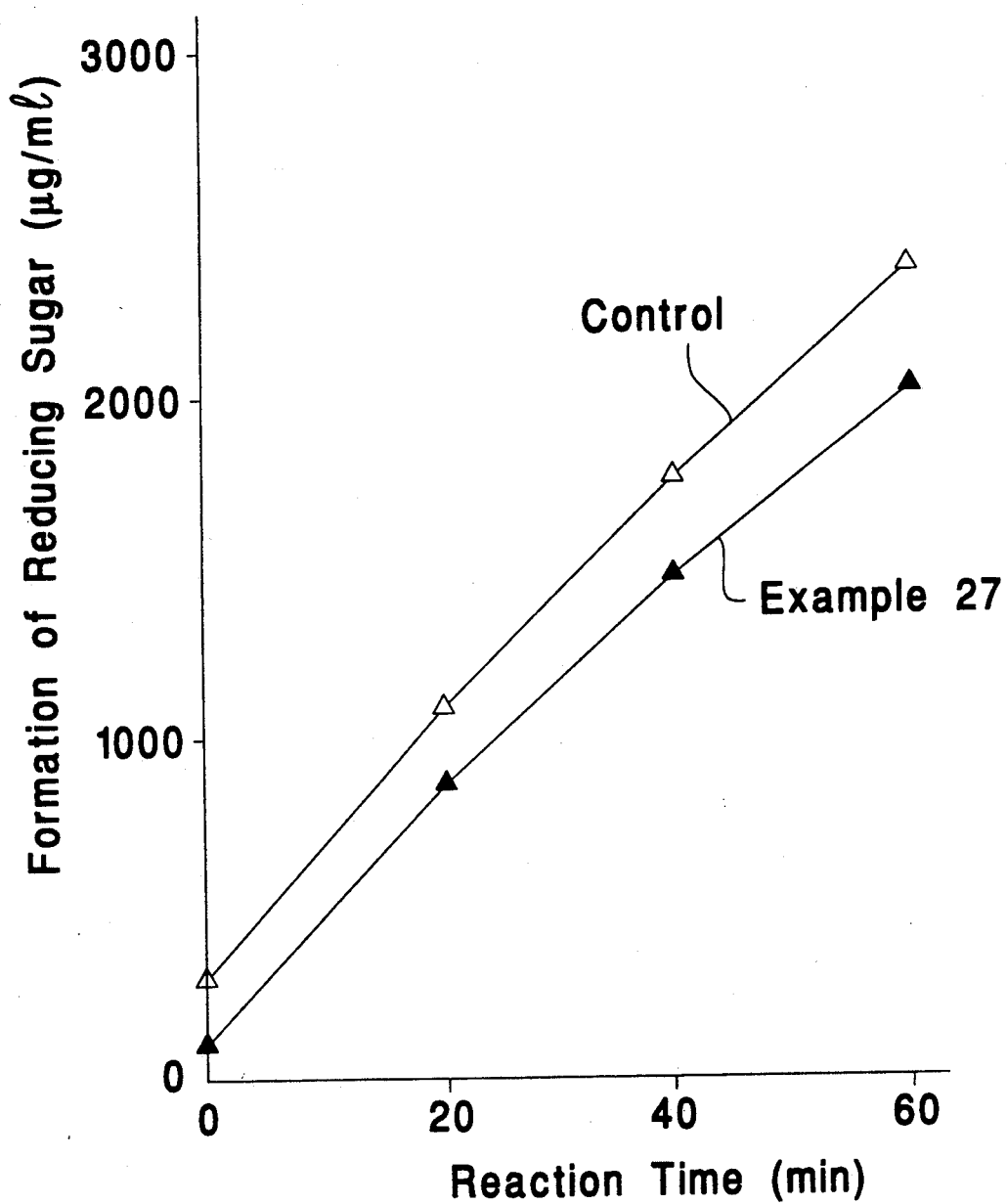

The sample was dried under a reduced vacuum at room temperature and then tested for digestibility with PPA. The digestibility with PPA, as shown in FIG. 4, was 93% of the farinaceous substance in a sample material prepared as a control by repeating the procedure described above, excepting the addition of the fatty acid ester to water was omitted.

EXAMPLE 28:

A sample material for food was obtained by adding to 100 g of rice grains 5 liters of water having 20 g of sucrose stearic acid ester (produced by Mitsubishi Kasei Kogyo K.K. and marketed under product code of "S-1570") dispersed in advance therein, allowing the resultant mixture to stand at 55° C. for 24 hours, discarding the supernatant, and freeze drying the residue.

Figure 5:
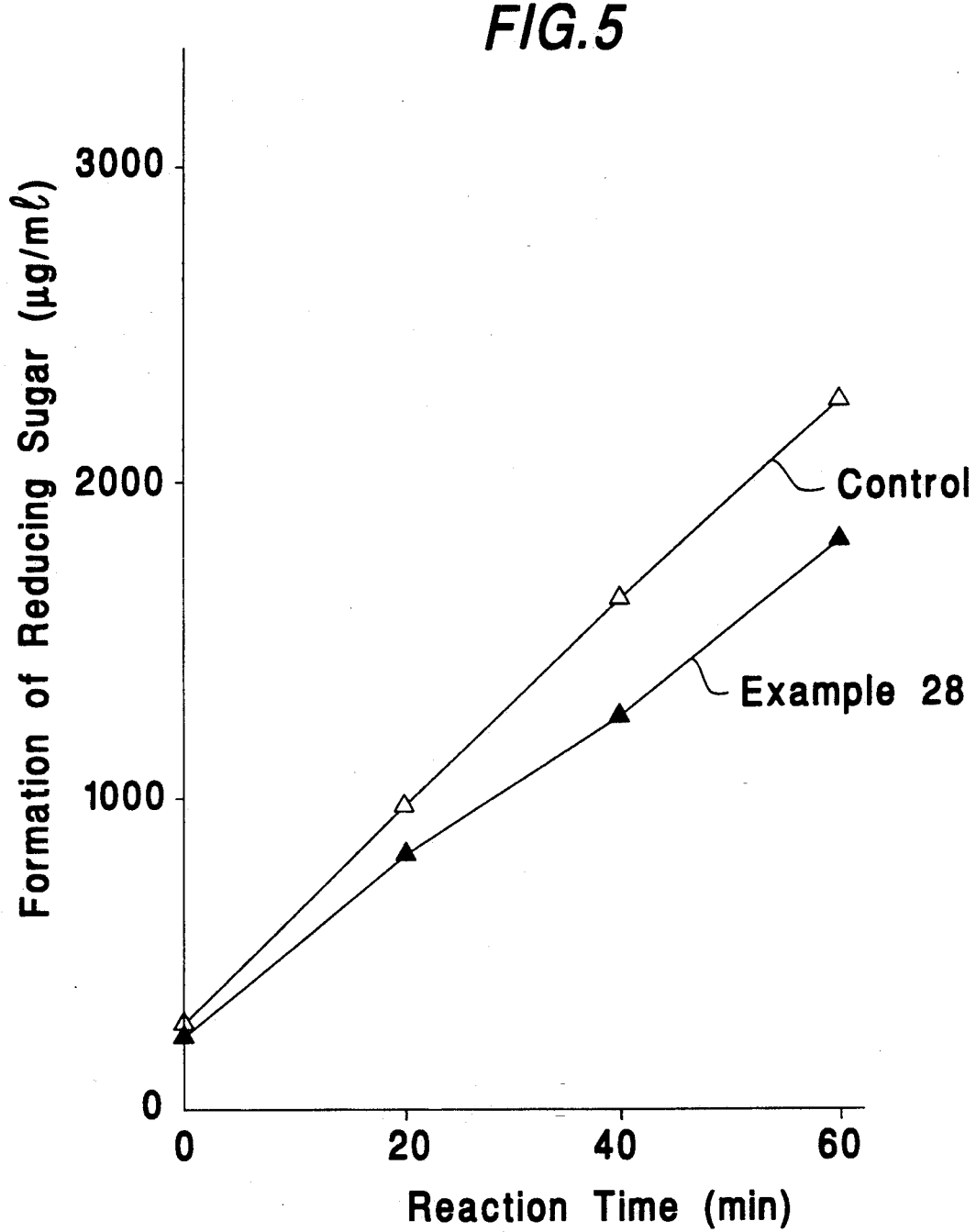

When 0.5 g of the sample was ground and tested for digestibility (after preparatory gelatinization) with PPA, the digestibility with PPA was found to be 75% of the untreated farinaceous substance as shown in FIG. 5.

EXAMPLE 29:

A sample material for food was obtained by adding to 50 g of wheat flour 5 liters of water having 5 g of glycerol monostearate (produced by Riken Vitamin Co., Ltd. and marketed under trademark designation of "Emulsy-MM100") dispersed in advance therein and allowing the resultant mixture to stand at 70° C. for 60 minutes and induce impregnation of the what flour with the aqueous solution.

Figure 6:
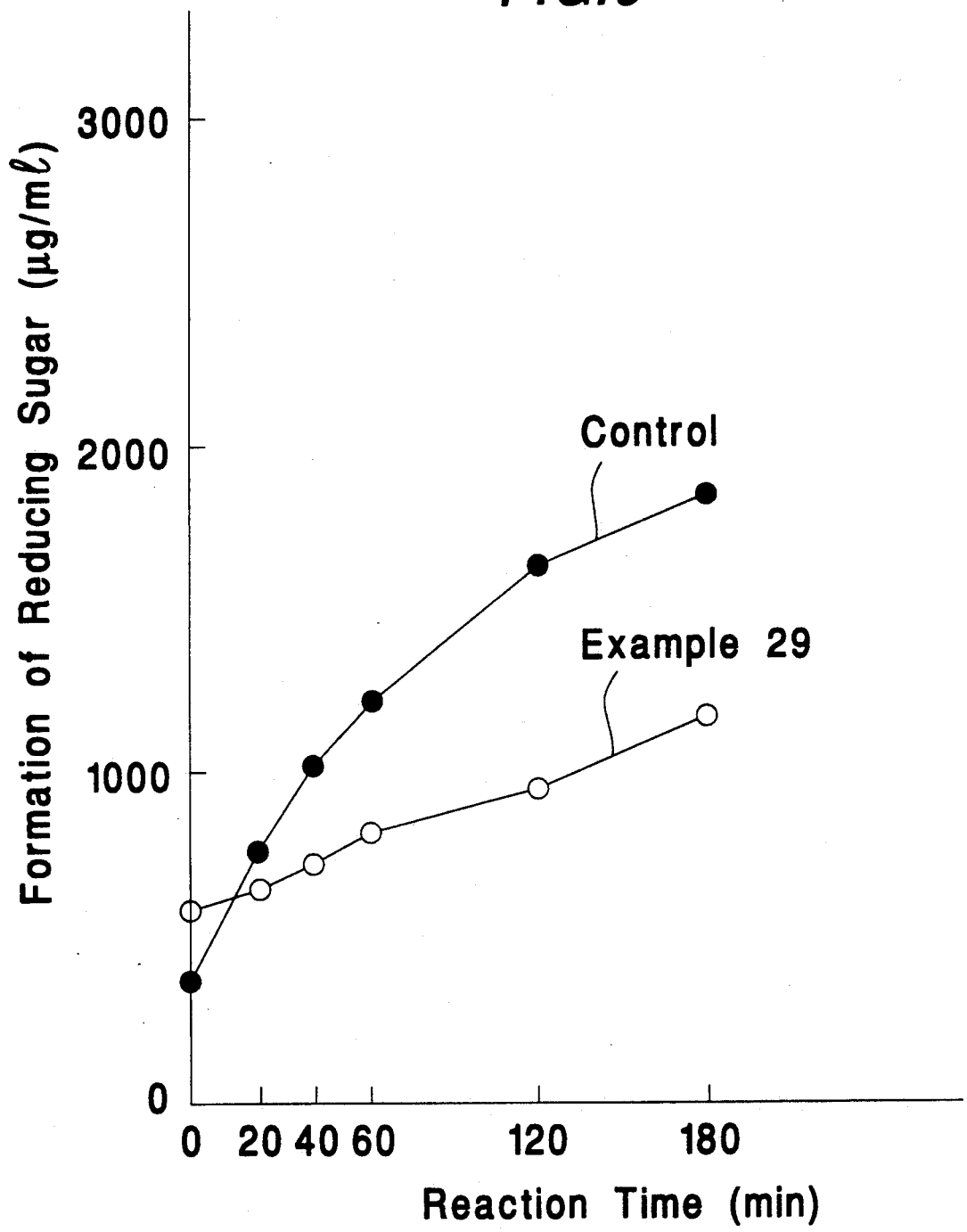

When the sample was freeze dried and then tested for digestibility with PPA, the digestibility with PPA was found to be 41% of the untreated farinaceous substance as shown in FIG. 6.

EXAMPLES 30 TO 33

Sample materials for food were obtained by adding to 50 g of wheat flour 5 liters of water having 5 g of glycerol monostearate (produced by Riken Vitamin Co., Ltd. and marketed under trademark designation of "Emulsy-MM100") dispersed in advance therein and allowing the resultant mixture to stand at 95° C. for a varying length of time shown below and induce impregnation of the wheat flour with the aqueous solution.

Figure 7:
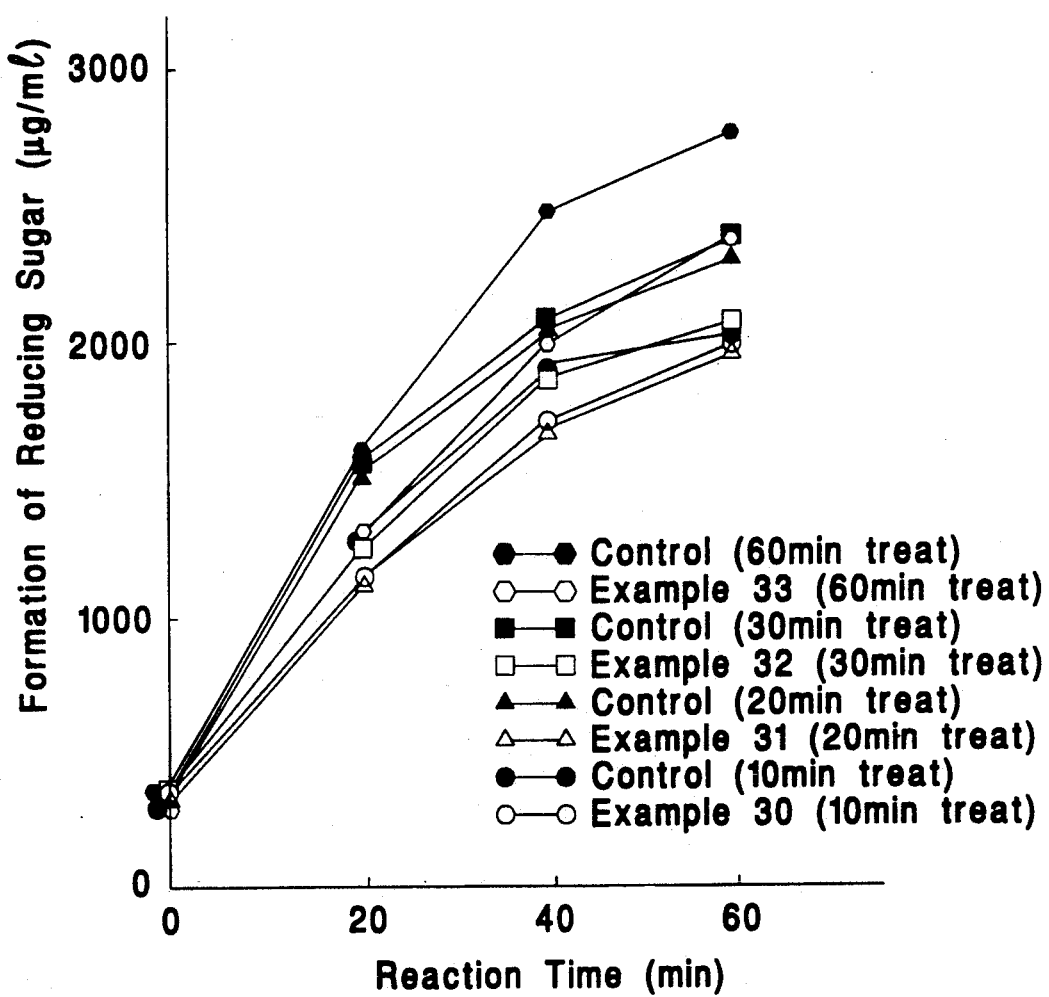

The samples were freeze dried and then tested for digestibility with PPA. As a control for each of the examples, a sample material for food was obtained by repeating the procedure described above, excepting the addition of glycerin monostearate to water was omitted. The results are shown in Table 4 and FIG. 7.

TABLE 4

|  | Treating time | Digestibility with PPA (based on control) |
|---|---|---|
| Example 30 | 10 minutes | 96% |
| Example 31 | 20 minutes | 82% |
| Example 32 | 30 minutes | 83% |
| Example 33 | 60 minutes | 84% |

EXAMPLE 34

A sample material for food was obtained by mixing 400 g of commercially available glutinous rice in the pulverized form with 100 g of commercially available wheat flour thereby preparing a starch as a raw material, adding to 500 g of the starch 5 liters of water having 200 g of sucrose stearic acid ester (produced by Mitsubishi Kasei Kogyo K.K. and marketed under product code of "S-1570") dispersed in advance therein, stirring the resultant mixture at 10° C. for 10 minutes, and discarding the supernatant and freeze drying the residue.

The sample was tested for occupation ratio to the amylose in the farinaceous substance by the fatty acid compound and for digestibility with PPA. As the result, the occupation ratio to the amylose in the farinaceous substance by the fatty acid compound was found to be 38% and the digestibility with PPA to be 92% of the starch as the raw material in the untreated state.

EXAMPLES 35 to 38

Figure 8:
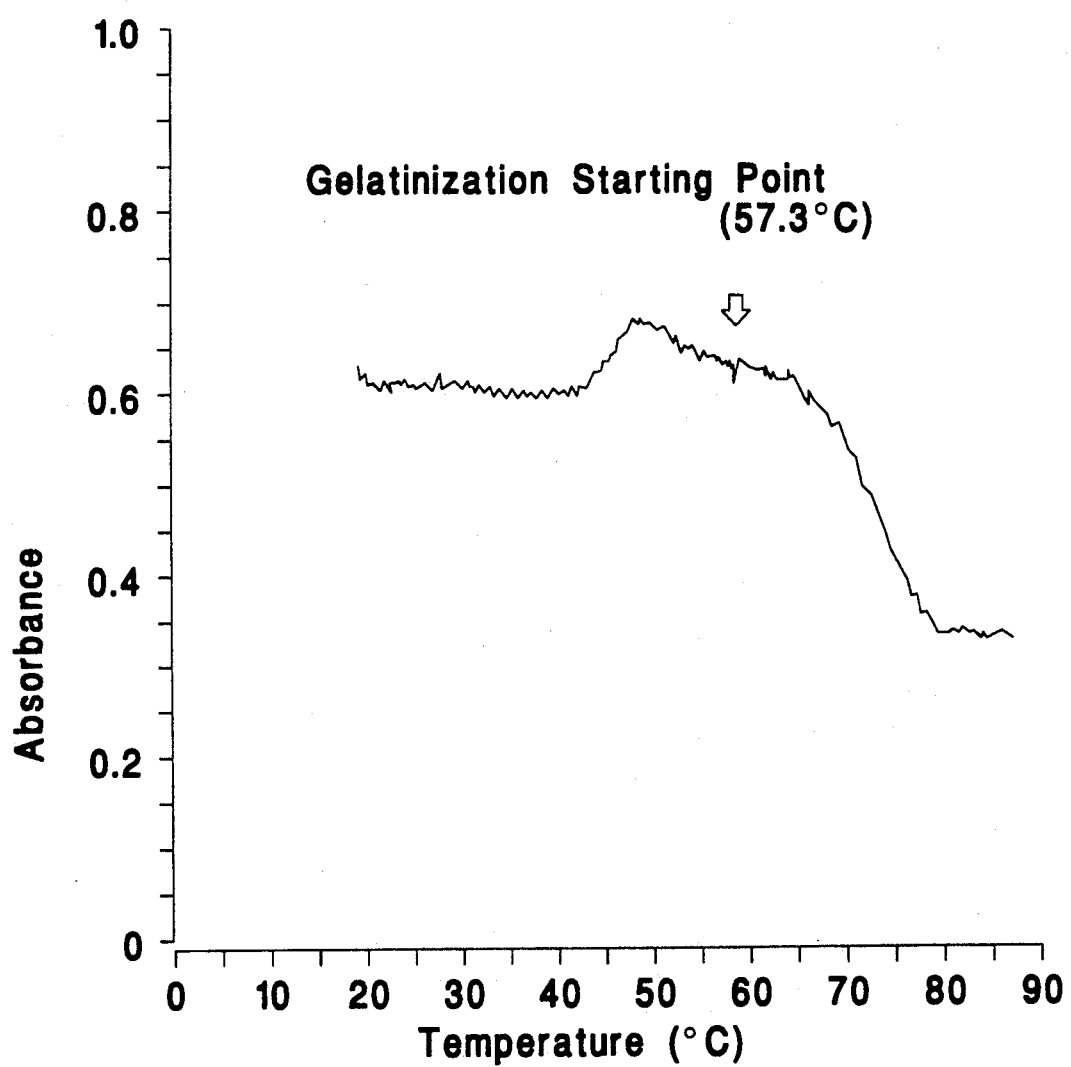
FIG. 8 is a diagram showing an absorbance curve obtained by photo-paste-graphy of a farinaceous substance used for control.
Figure 9:
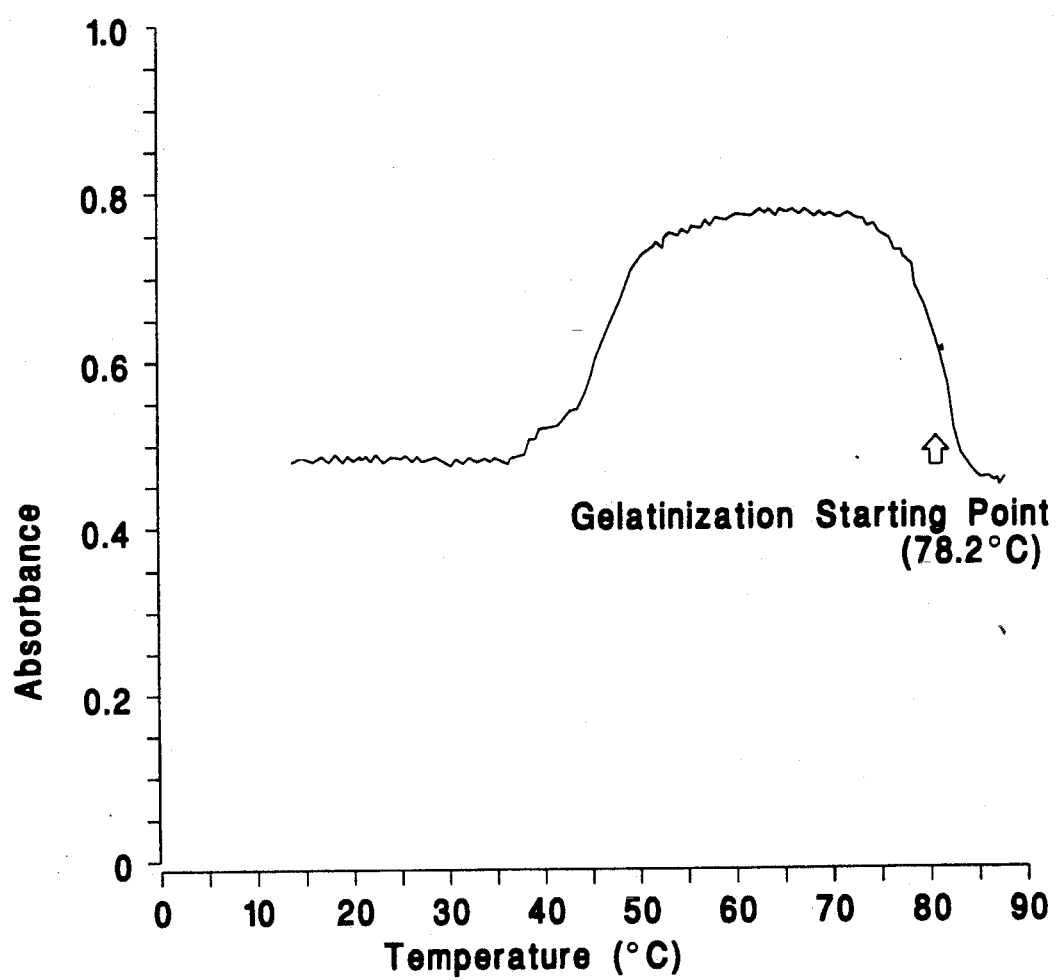
FIGS. 9 and 10 are diagrams showing absorbance curves obtained by photo-paste-graphy of materials for food according with the present invention.
Figure 10:
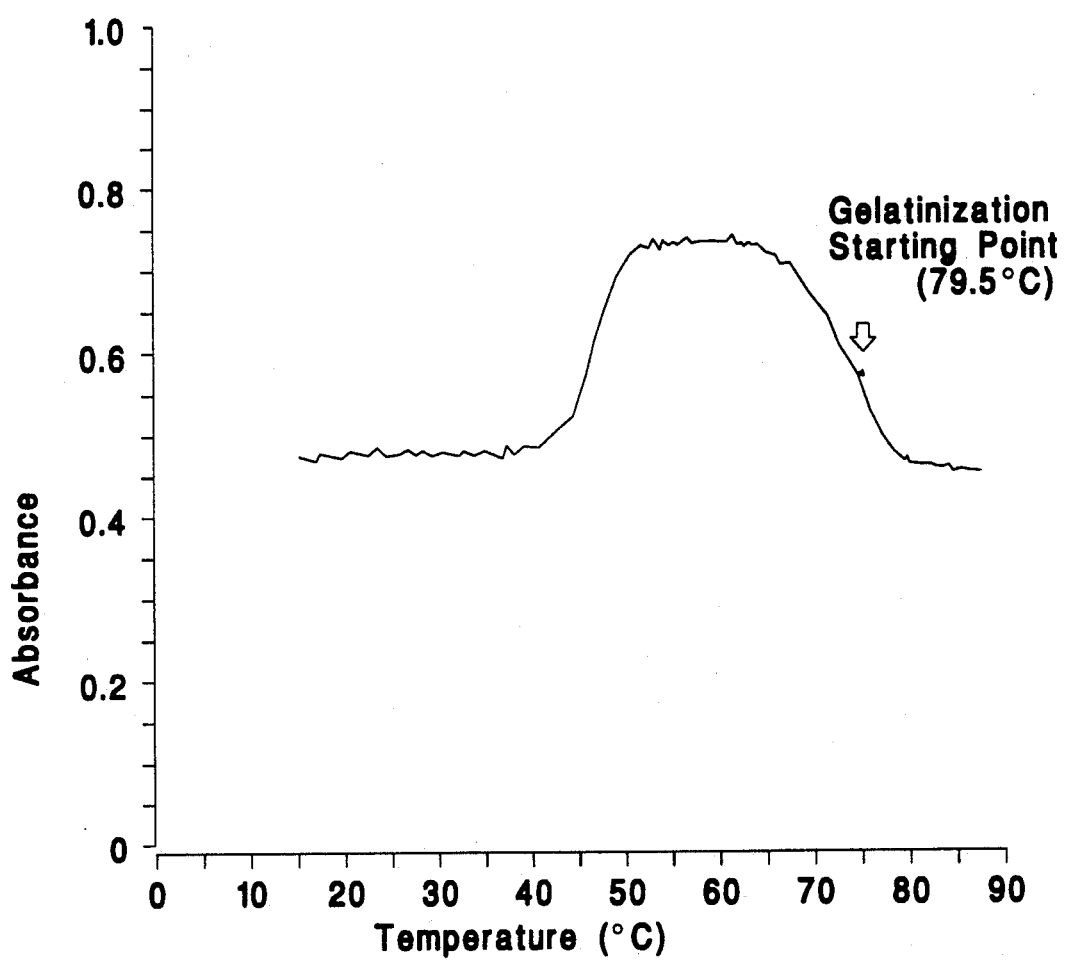

Sample materials for food were obtained by adding to 1 kg of a varying farinaceous substance indicated in Table 5, 3 liters of water having 50 g of sucrose stearic acid ester (produced by Mitsubishi Kasei Kogyo K.K. and marketed under product code of "S-1570") or glycerol monostearate (produced by Riken Vitamin Co., Ltd. and marketed under trademark designation of "Emulsy-MS") dispersed in advance therein, gently stirring the resultant mixture at 30° C. for 1 hour, discarding the supernatant and freeze drying the residue. The samples were dried in draft at room temperature and tested for the temperature at which gelatinization was started. The temperature consequently found were compared with the temperatures at which the samples in the untreated state began to undergo gelatinization. The results are shown in Table 5. FIGS. 8 to 10 show the curves of absorbance obtained by the photo-pastegraphy when the untreated wheat flour, the wheat flour treated with S-1570 (Example 35), and the wheat flour treated with Emulsy-MS (Example 36) were tested for the temperature at which gelatinization started.

TABLE 5

|  | Farinaceous substance | Fatty acid compound | Temperature for gelatinization starting (difference from that for untreated sample) |
|---|---|---|---|
| Example 35 | Wheat flour | S-1570 | +23° C. |
|  | Wheat flour | Emulsy-MS | +24° C. |
|  | Rice powder | S-1570 | +14° C. |
|  | Rice powder | Emulsy-MS | +15° C. |

EXAMPLE 39

A sample material for food was obtained by adding to 10 kg of commercially available wheat flour 1.5 liters of water having 200 g of glycerol monostearate (produced by Riken Vitamin Co., Ltd. and marketed under trademark designation of "Emulsy-MS") dispersed in advance therein, heating and kneading the resultant mixture under application of pressure at 130° C. for 1 minute, and freeze drying the kneaded mixture. As a control, a sample material for food was obtained by repeating the procedure described above, excepting the addition of glycerol monostearate to water was omitted.

A group of ten 4-week old male rats of SD series (average body weight 170 g) each in a test plot and a control plot were left consuming a feed prepared so as to contain 70% by weight of the sample material for 2 weeks. At the end of the two week's breeding, the rats were sacrificed, dissected, and examined as to the amount of body fat.

As the result, the rats in the test plot showed better growth than those in the control plot, registering body weights of 104% based on the body weights of the rats in the control plot and sample intakes of 106% based on the sample intakes of the rats in the control plot. In contrast, they showed clearly small amounts of body fat of 89% based on those of the rats in the control plot and similarly small amounts of hepatic fat of 89% based on those of the rats in the control plot.

EXAMPLE 40

A sample material for food was obtained by adding to 100 g of wheat flour 300 g of water having 5 g of sucrose stearic acid ester (produced by Mitsubishi Kasei Kogyo K.K. and marketed under product code of "S-1570") dispersed in advance therein, stirring the resultant mixture at 30° C. for 60 minutes, and thereafter freeze drying the resultant mixture.

A mixture of 50 g of the sample material with 150 ml of water was autoclaved at 121° C. for 30 minutes and orally administered to one healthy male human subject. After the administration, blood samples were taken regularly from the subject and tested for blood sugar content by the use of a commercially available testing instrument (produced by Ames-Sankyo K.K. and marketed under trademark designation of "Glucoster").

Figure 11:
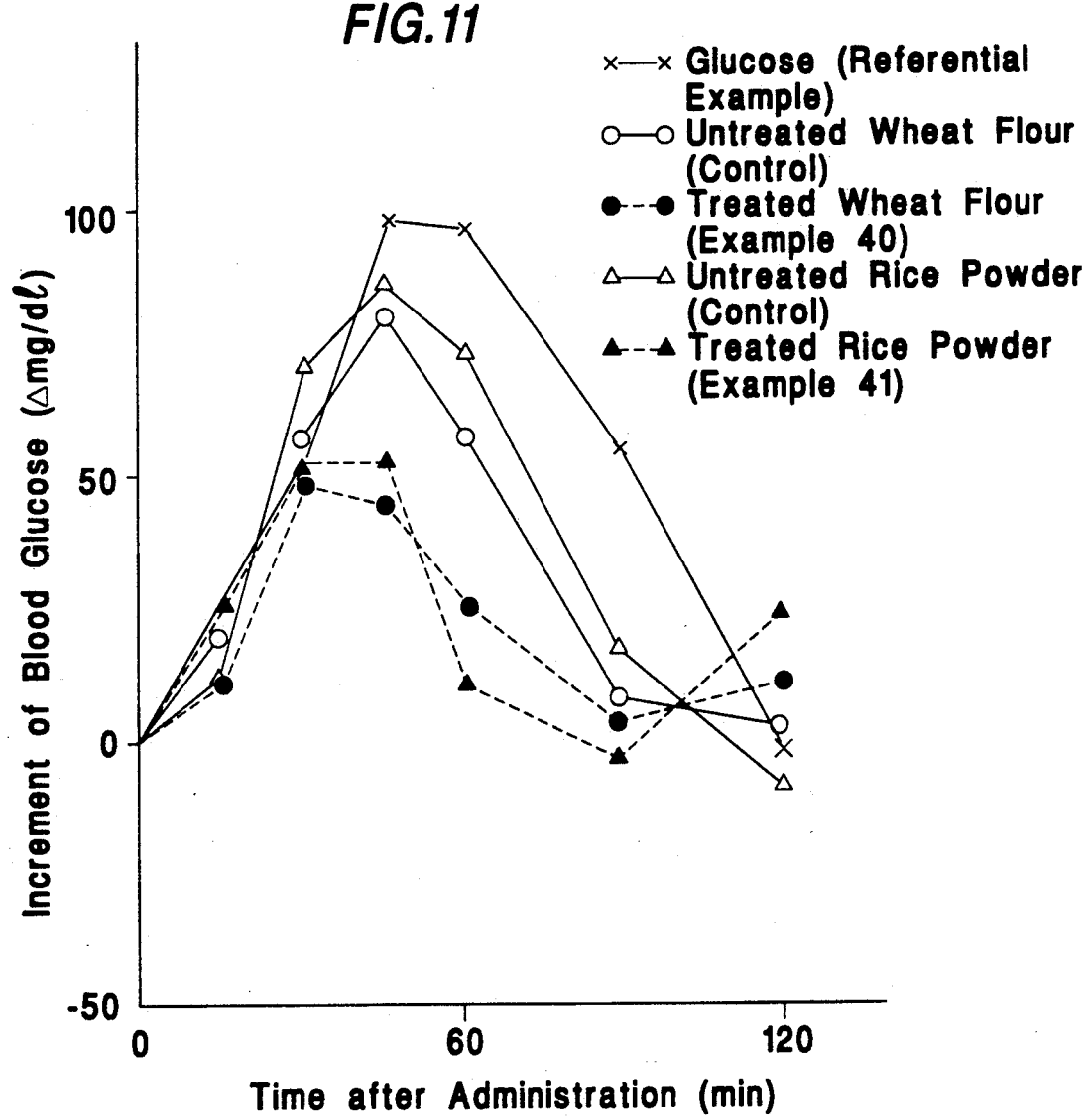
FIG. 11 is a diagram showing a time-course change of the blood sugar level in a human subject administered with a farinaceous substance for the material of food of this invention, in working examples and controls.

It is clearly noted from the results shown in FIG. 11 that, during the test using the sample, the increase of blood sugar level was evidently retarded by 63% in area ratio and by 61% in peak height as compared with the values found for the control using wheat flour (treated solely by autoclaving at 121° C. for 30 minutes).

EXAMPLE 41

A sample material for food was prepared by following the procedure of Example 40, excepting rice powder was used in the place of as a farinaceous substance instead. It was similarly given a heat treatment and orally administered to one healthy male human subject. After the administration, blood samples were taken from the subject and tested for change in blood sugar content.

It is clearly noted from the results given in FIG. 11 that, during the test using the sample, the increase of blood sugar level was evidently retarded by 64% in area ratio as compared with the value found for the control using powdered rice (treated solely by autoclaving at 121° C. for 30 minutes).

EXAMPLES 42 AND 43

Sample materials for food were prepared by following the procedure of Example 40, excepting sorbitan lauric acid ester (produced by the Kao Soap Co., Ltd. and marketed under trademark designation of "Emasol L-10") (Example 42) or glycerol monostearate (produced by Riken Vitamin Co., Ltd. and marketed under trademark designation of "Emulsy-MS") (Example 43) was used in the place of the sucrose stearic acid ester. The samples were similarly autoclaved and orally administered each to one healthy male human subject. After the administration, blood samples were taken and tested for blood sugar content.

It is clearly noted from the results that the increase of blood sugar level was evidently retarded by 88% (Example 42) and by 75% (Example 43) in area ratio as compared with the control using wheat flour (treated solely by autoclaving at 121° C. for 30 minutes).

EXAMPLES 44 AND 45

Sample materials for food were prepared by following the procedure of Example 41, excepting glycerol monostearate (produced by Riken Vitamin Co., Ltd. and marketed under trademark designation of "Emulsy-MS") (Example 44) or lecithin (produced by Honen Seiyu K. K. and marketed under product code of "AY-A") (Example 45) was used in the place of the sucrose stearic acid ester. The samples were similarly autoclaved and orally administered each to one healthy male human subject. After the administration, blood samples were taken from the subject and tested for blood sugar content.

It is clearly noted from the results that, during the test using the sample, the increase of blood sugar level was evidently retarded by 85% (Example 44) and 75% (Example 45) in area ratio as compared with the plot using rice powder (treated solely by autoclaving at 121° C. for 30 minutes).

EXAMPLE 46

A sample material for food was obtained by adding to 10 kg of commercially available extra-strength wheat flour 30 liters of water having 500 g of glycerol monostearate (produced by Riken Vitamin Co., Ltd. and marketed under trademark designation of "Emulsy-MS2), stirring the resultant mixture at 30° C. for 1 hour, and discarding the supernatant and freeze drying the residue.

A bread mix was prepared by adding 150 g of oil and fat, 150 g of sugar, and 120 g of protein to 2 kg of the sample material. In a commerically available baking oven, 280 g of the bread mix and 3 g of dry yeast added thereto were baked. Consequently, there was obtained a loaf of bread. In accordance with the method of blind trial, several volunteers were asked to try the bread using the treated strong flour and a loaf of bread prepared by following the procedure described above, excepting the extra-strength flour was used in its untreated state, and make their choice. No significant difference was found in their choice.

Figure 12:
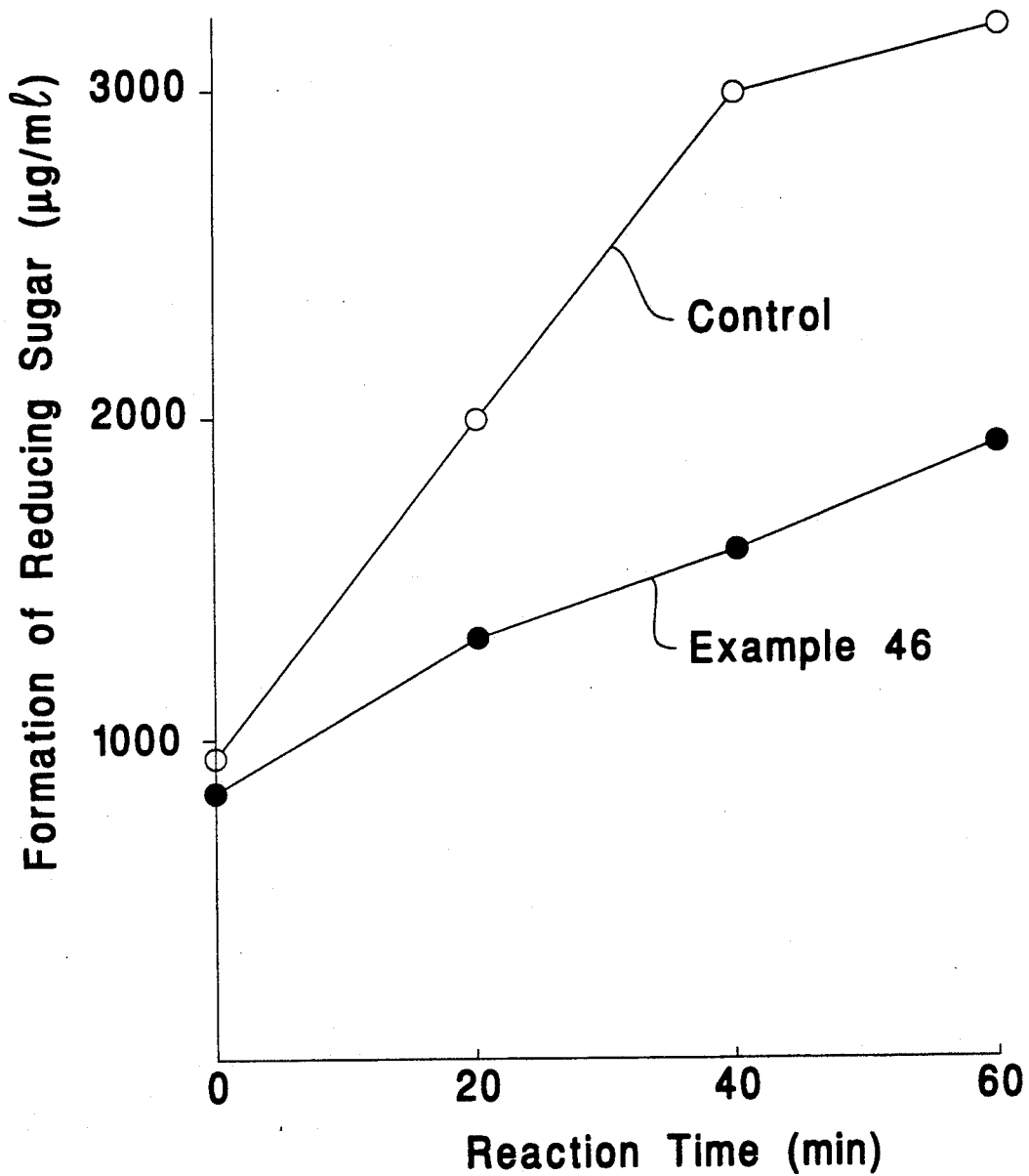
FIGS. 12 and 13 are graphs showing the amount of reducing sugar formed in the PPA treatment of the food of this invention working examples and controls.
Figure 13:
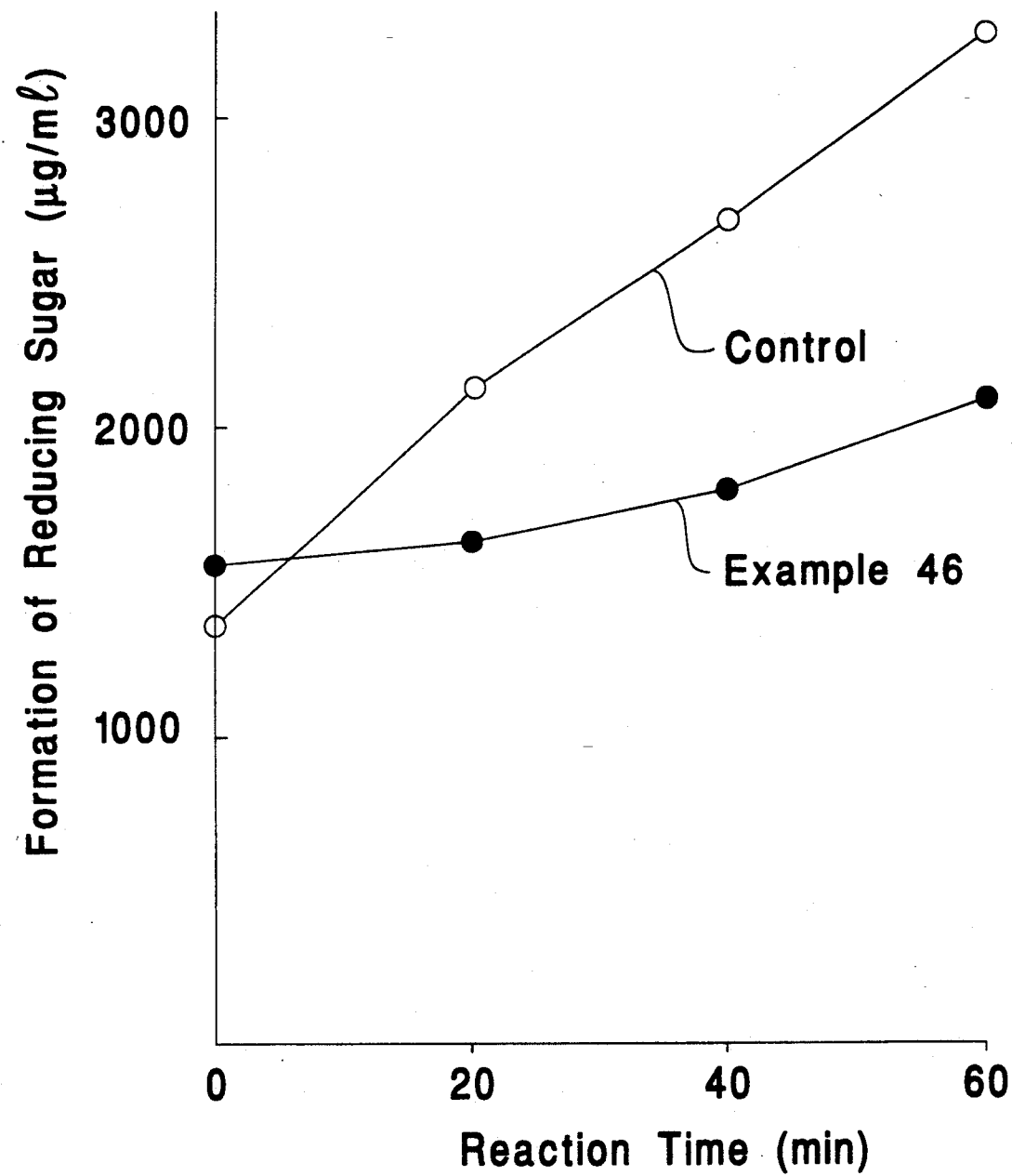

A sample food was obtained by freeze drying the loaf of bread using the treated strong wheat flour obtained as described above. A 0.5-g portion of this sample food and 50 ml of water added thereto were heat-treated at 95° C. for 30 minutes and then tested for digestibility with PPA. The digestibility with PPA was found to be 48% of the loaf of bread using the strong wheat flour in the untreated state, as shown in FIG. 12. A mixture of 0.5 g of the sample food with 50 ml of water was tested for digestibility with PPA. The digestibility with PPA was found to be 27% of the loaf of bread using the extra-strength wheat flour in the untreated state, as shown in FIG. 13.

EXAMPLE 47

A sample material for food was obtained by adding to 1 kg of commerically available weak wheat flour 3 liters of water having 50 g of sucrose stearic acid ester (produced by Mitsubishi Kasei Kogyo K.K. and marketed under product code of "S-1570") dispersed in advance therein, stirring the resultant mixture at 30° C. for 1 hour, and discarding the supernatant and dry freezing the residue.

A hot cake mix was prepared by thoroughly kneading 78 g of the sample with 9 g of sugar, 1.5 g of egg white powder, 7 g of wheat gluten, 0.5 g of common salt, 2.5 g of an inflating agent, and 1.5 g of spice. When this hot cake mix was baked by the conventional method, there was obtained a hot cake of highly satisfactory taste and palatability. In accordance with the method of blind trial, several volunteers were asked to try the hot cake prepared by using the treated wheat flour and a hot cake separately obtained by following the procedure described above, excepting the wheat flour was used in its untreated state, and to make their choice. No significant difference was found in the choice.

EXAMPLE 48

A sample material for food was obtained by adding to 1 kg of commercially available rise powder 3 liters of water having 50 g of sucrose stearic acid ester (produced by Mitsubishi Kasei Kogyo K.K. and marketed under product code of "S-1570") dispersed in advance therein, stirring the resultant mixture at 30° C. for 1 hour, and discarding the supernatant and freeze drying the residue.

An inflated food of highly satisfactory taste and palatability was obtained by thoroughly mixing 90 g of the sample material with 3 g of powdered oil, 5 g of maize fibers, and 2 g of egg shell powder, and suitably watering the resultant mixture and extruding the mixture through a twin-arm extruder at a temperature in the range of 120° to 130° C. under a pressure in the range of 20 to 25 kg/cm². In accordance with the method of blind trial, several volunteers were asked to try the inflated food using the treated rice powder and an inflated food separately prepared using the rice in the untreated state and make their choice. No significant difference was found in their choice.

EXAMPLE 49

A sample material for food was obtained by adding to 1 kg of commercially available extra-strength wheat flour 3 liters of water having 50 g of glycerol monostearate (produced by Riken Vitamin Co., Ltd. and marketed under trademark designation of "Emulsy-MS") dispersed in advance therein, stirring the resultant mixture at 30° C. for 1 hour, and discarding the supernatant and freeze drying the residue.

A dough was prepared by mixing 800 g of the sample material with 20 g of dextrin (produced by Matsutani Kagaku K.K. and marketed under trademark designation of "Pinedex 4"), 30 g of vital gluten (produced by Showa Sangyo K.K. and marketed under trademark designation of "Powder Gel A"), and 400 g of water in a mixer.

A raw noodle was obtained by repeatedly doubling and extending the dough by the conventional method using a noodle-making roll and slicing.

When 300 g of the raw noodle was boiled thoroughly in boiling water, there was obtained a steamed noodle of highly satisfactory taste and palatability.

In accordance with the method of blind trial, several volunteers were asked to try the steamed noodle using the treated extra-strength wheat flour and a steamed noodle prepared separately with the wheat flour in the untreated state and make their choice. No significant difference was found in their choice.

The methods of determination mentioned in the working examples cited above were as follows.

Occupation ratio to the amylose in the farinaceous substance by the fatty acid compound For the purpose of alkali gelatinization, 0.1 g of a given sample is mixed with 20 ml of 0.5N KOH and stirred until complete disappearance of lumps, then combined with 150 ml of purified water, and neutralized with 20 ml of HCl, to obtain 190 ml of a liquid. A mixture prepared by keeping 95 ml of the sample liquid cooled with ice and, at the same time, adding 5 ml of 0.4N KI to the cooled liquid is titrated under application of a voltage of 25 mV by the addition of 0.00157N KIO$_3$ at a rate of 0.5 ml per minute, to determine the change in electric current passing the liquid under test. The point at which the electric current begins to rise sharply is taken as the point of inflection and the amount of the titrant added up to that point is taken as the value of titration. Separately, the total sugar content of 0.1 g of the same sample is determined by the phenolsulfuric acid method. The iodine affinity of a given sample is calculated in accordance with the following formula using the value of titration and the total sugar content and the amylose ratio in a farinaceous substance due to a fatty acid compound is determined in accordance with the formula given further herein below.

Iodine affinity (amount of iodine in mg/100 mg of total sugar content) =

$$\frac{\text{Value of titration (ml)} \times 20}{\text{Total sugar content (mg)}} \times 100$$

Digestibility with porcine pancrease amylase (PPA)

In a shaken constant temperature bath adjusted in advance to 37° C., a mixture of 0.5 g of a given sample with 49 ml of a phosphate buffer solution (pH 6.9) is left standing for 30 minutes. The diluted sample is set reacting by addition thereto of 1 ml of an enzyme solution separately prepared by diluting PPA (product of Sigma Corp) with a phosphate buffer solution to a concentration of 50 μU/ml. At intervals of 0, 20, 40, and 60 minutes following the start of the reaction, two samples 0.2 ml in volume are taken at a time from the reaction solution and placed in test tubes containing 3.8 ml of 1N NaOH to stop the enzymatic reaction proceeding in the samples.

The determination of the reducing sugar produced by digestion with PPA is carried out by the Somogyi-Nelson method.

Where a sample is required to be gelatinized in advance, the gelatinization is effected by adding a phosphate buffer solution to the sample and heating the resultant mixture in a boiling water bath for 30 minutes.

Temperature for starting gelatinization

A solution prepared by diluting 0.1 g of a given sample with 100 ml of purified water (aqueous suspension of 0.1% by weight of sample) is set in a cell of a photopaste-graphy (PHPG) apparatus. The sample solution in the cell is kept stirred and, at the same time, heated at a temperature increasing rate of 2° C./minute. In this while, the measurement of absorbance of the sample solution at 372 nm is continued until the temperature rises to 95° C. The temperature at the point of inflection at which the absorbance changes sharply is taken as the temperature for starting gelatinization. The photopaste-graphy apparatus to be used in this test is a product of Hirama Rikagaku Kenhyujo.

It should also be understood that the foregoing relates to only the scope of the invention is defined by the appended claims rather than by the description preceding them, and all changes that fall within meets and bounds of the claims, or equivalence of such meets and bounds are therefore intended to embraced by the claims.

We claim:

1. A material which can be used to make a food and which is relatively slowly adsorbed by the digestive system, comprising a farinaceous substance and a fatty acid compound bound to said farinaceous substance wherein the gravimetric ratio of said farinaceous substance to said fatty acid compound is in the range of 100:2-50, and wherein the occupation ratio of the amylose in said farinaceous substance by said fatty acid compound ranges from 10% to 100%.

2. A material according to claim 1, wherein said fatty acid compound is an amphipatic substance.

3. A material according to claim 2, wherein said amphipatic substance is selected from the group consisting of free fatty acids, and salts or esters thereof.

4. A material according to any one of claims 1 to 3, wherein said farinaceous substance is a cereal powder or a cereal grain.

5. A material according to any one of claims 1 to 3, wherein said occupation ratio of the amylose in said farinaceous substance by said fatty acid compound is not less than 40%.

6. A food which is relatively slowly adsorbed by the digestive system which contains the material set forth in any one of claims 1 to 3.

7. A food composition which is suitable for administration to a person suffering from obesity which contains the material set forth in any one of claims 1-3.

8. A food composition which is suitable for administration to a diabetic which contains the material set forth in any one of claims 1-3.

9. A material according to claim 4, wherein said occupation ratio of the amylose in said farinaceous substance by said fatty acid compound is not less that 40%.

10. A food which is relatively slowly adsorbed by the digestive system which comprises the material of claim 4.

11. A food which is relatively slowly adsorbed by the digestive system which comprises the material of claim 5.

* * * * *

UNITED STATES PATENT AND TRADEMARK OFFICE
CERTIFICATE OF CORRECTION

PATENT NO. : 5,246,723
DATED : September 21, 1993
INVENTOR(S) : Toshiki KAMEYAMA et al It is certified that error appears in the above-indentified patent and that said Letters Patent is hereby corrected as shown below:

In Column 9, line 24, delete "905" and insert -- 90% --.

In Column 18, line 5, after "<u>Value of titration(ml) x 20</u> x 100", please insert
Total sugar content (mg)

-- Occupation ratio to the amylose (%) in the farinaceous substance by the fatty acid compound =

[{(iodine affinity of untreated farinaceous substance) -

(iodine affinity of treated farinaceous substance)} /

(Iodine affinity of untreated farinaceous substance)]

x 100 --

Signed and Sealed this

Twelfth Day of April, 1994

Attest:

BRUCE LEHMAN

*Attesting Officer*     *Commissioner of Patents and Trademarks*